Aug. 8, 1933. V. G. APPLE 1,921,111
DYNAMO ELECTRIC MACHINE STATOR WITH NONCORROSIVE LINING
Filed Dec. 15, 1930 2 Sheets-Sheet 1
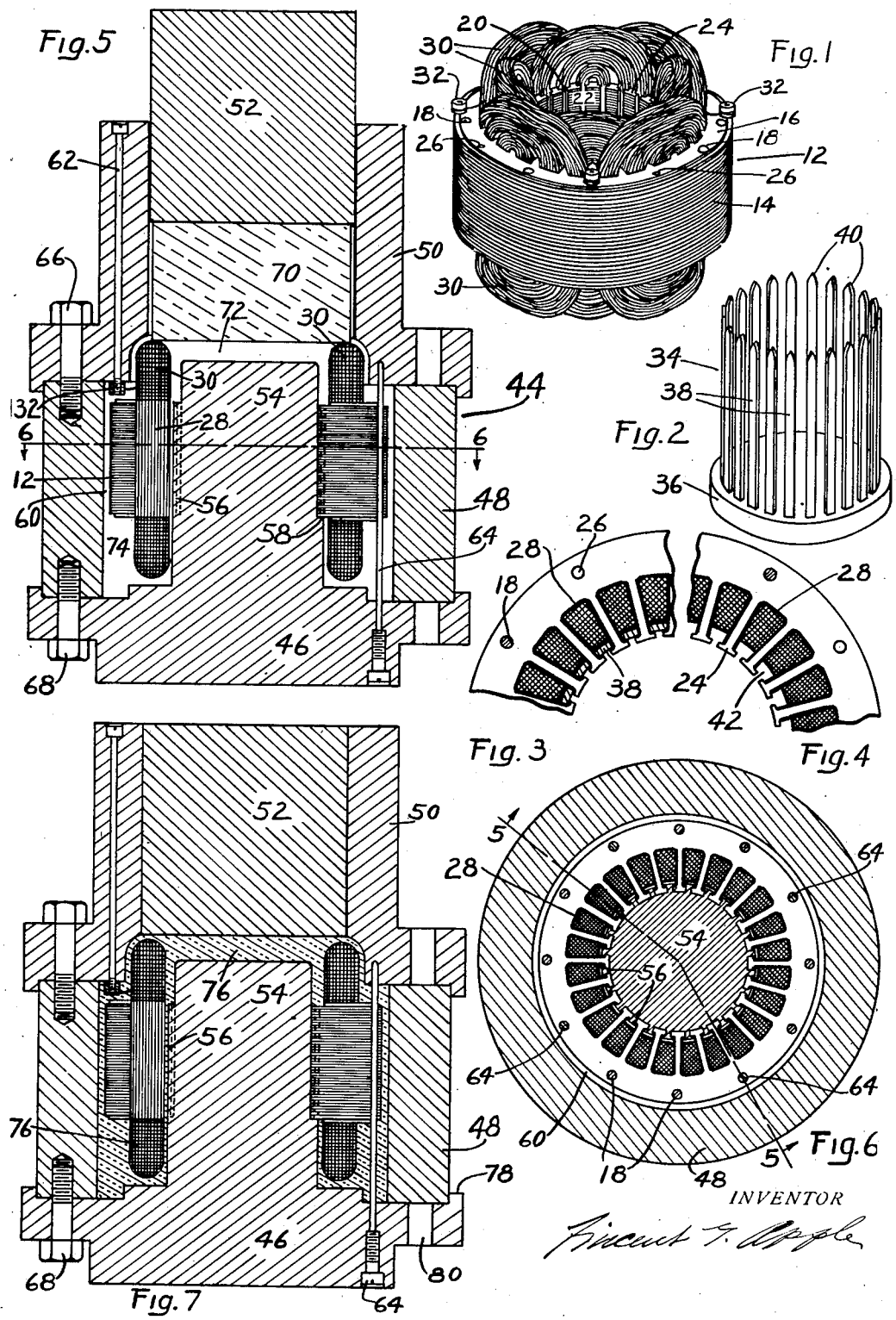
INVENTOR Aug. 8, 1933.  V. G. APPLE  1,921,111
DYNAMO ELECTRIC MACHINE STATOR WITH NONCORROSIVE LINING
Filed Dec. 15, 1930    2 Sheets-Sheet 2
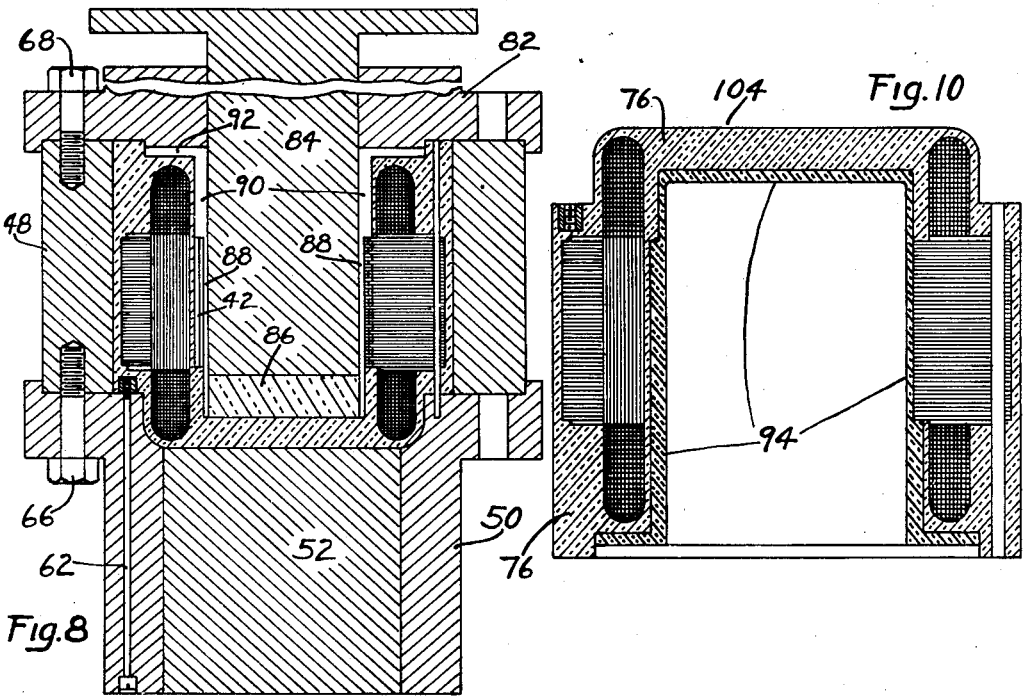
Fig. 8
Fig. 10
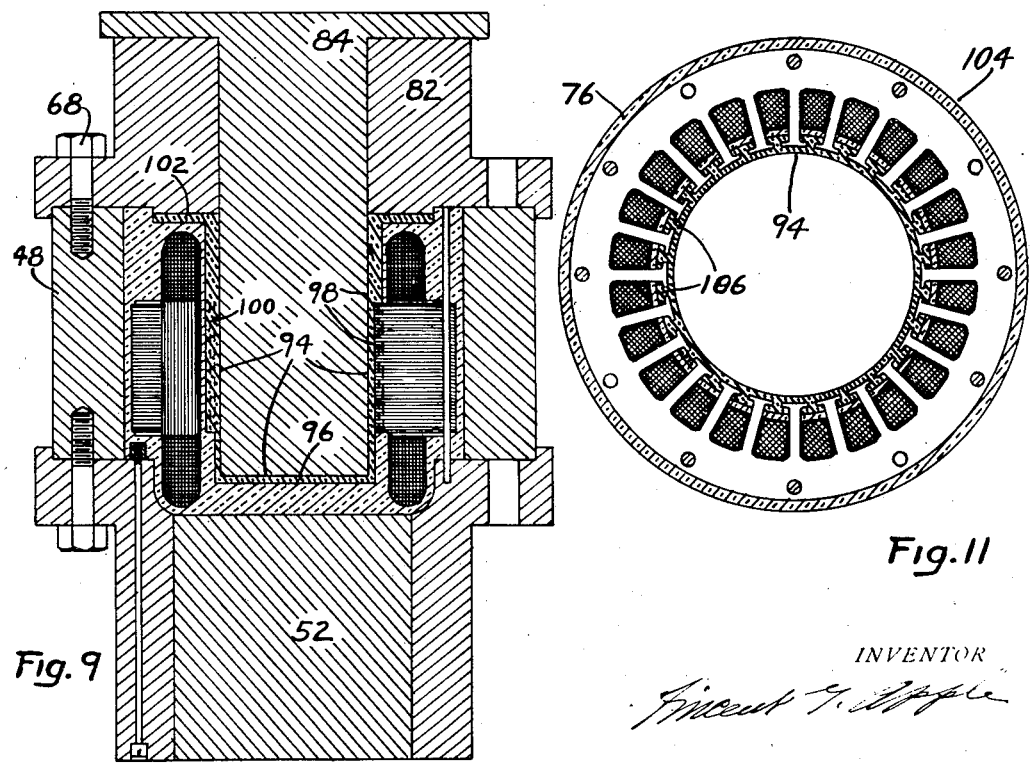
Fig. 9
Fig. 11
INVENTOR Patented Aug. 8, 1933

1,921,111

UNITED STATES PATENT OFFICE 1,921,111

DYNAMO ELECTRIC MACHINE STATOR WITH NONCORROSIVE LINING

Vincent G. Apple, Dayton, Ohio; Herbert F. Apple, Edward M. Apple, and Gourley Darroch executors of said Vincent G. Apple, deceased Application December 15, 1930. Serial No. 502,331

1 Claim. (Cl. 172—36)

This invention relates to stators for alternating current motors and particularly to stators the body of which is composed of an insulating compound within which the core and windings are imbedded.

Stators of this type are particularly adapted to situations where any exposed metal portions would be subject to the action of moisture, or of acid fumes or acids themselves, which would tend to corrode such metal parts, and there are situations where it is desirable that not only the windings, but the entire core, both inside and outside, be covered by and sealed in a non-corrosive body.

Since it is not possible to mold a substance entirely around a structure while it is being held at any part it is an object of this invention to provide means and a procedure whereby the stator core may be supported at one portion while a non-corrosive plastic material is molded around the remaining portion, then supported by the part thus covered and non-corrosive material molded about the part by which it was first supported, and since two separate molding operations are required to entirely surround the structure it may usually be desirable that different plastic materials be employed for the two operations.

There is now available a variety of insulating compounds which may be reduced to a fluid or plastic state, molded to form and hardened, and those compounds vary considerably in their characteristics, some being capable of being rendered highly fluid and penetrative, while others may be made barely plastic; some being resistant to acids and other corrosive substances while others are dissolved thereby; some being highly suited for certain purposes but too costly to be used in large amounts.

It is therefore another object of this invention to provide a stator of this kind having a body which may be composed of more than one kind of material and in which the major portion of the body within which the winding is imbedded may be of an insulating compound which is highly penetrative and otherwise suitable for the purpose and of comparatively low cost, while a lesser part of the body may consist of a lining of another kind of material which, although more costly and less mobile and of less insulating value, is nevertheless more highly resistant to acids and corrosive gases, to the end that a motor having a stator of my improved construction may be employed in situations where the inside or rotor chamber is subjected to the action of acids or corrosive gases as where it is employed in direct driven acid pumps or in electrically driven refrigerating units wherein the interior of the motor is subjected to the action of the refrigerant to a greater degree than the outside of the motor.

I attain these objects by the structure hereinafter described, reference being had to the accompanying drawings, wherein, Fig. 1 is a perspective view of a stator core with the windings in place.

Fig. 2 is a perspective view of a tool employed to keep the coil sides pressed toward the bottoms of the slots until they are hardened.

Fig. 3 is a fragmentary section taken transversely through the wound structure with the tool Fig. 2 inserted, in which condition the winding is hardened.

Fig. 4 is a fragmentary section taken transversely through the wound structure after the winding is hardened and the tool Fig. 2 withdrawn.

Fig. 5 is an axial section taken at 5—5 of Fig. 6 showing the structure in a mold ready to have the main body of insulation molded about the core and winding.

Fig. 6 is a transverse section taken at 6—6 of Fig. 5.

Fig. 7 shows the structure after the main body of insulation is molded.

Fig. 8 shows the structure Fig. 6 with the bottom of the mold removed, the remainder of the structure inverted, and a new mold part substituted for that removed whereby it is adapted to mold the lining of different insulation into the rotor opening of the stator.

Fig. 9 shows the mold after the lining has been molded into place.

Fig. 10 is an axial section through a completed stator.

Fig. 11 is a transverse section through the completed stator.

Similar numerals refer to similar parts throughout the several views.

The core 12 is made up of a plurality of laminæ 14 with heavier metal rings 16 at the ends, all held together by rivets 18. The winding slots 20 encircle the rotor opening 22 and are separated by the core teeth 24. Midway between the rivets 18 a series of holes 26 extend longitudinally entirely through the core. Holes 26 are provided to facilitate securing an end-enclosing head at the open end of the finished stator.

In order to provide more effective insulation for the winding I may use insulated magnet wire, preferably of the kind having a cotton or other fibrous covering, and impregnate and coat the covering with a fluid insulation before it is wound into the coils. A convenient method of so impregnating and coating a wire is shown and described in my copending application Serial No. 356,586, filed April 19th, 1929, but the older method of first winding the coil and impregnating it afterwards may be followed if desired.

In the embodiment shown in the drawings the winding is of the two phase four pole distributed type wherein the coil sides 28 do not entirely fill the slots, and the coil heads 30 are in the form of substantially continuous rings extending from the ends of the core around the rotor opening 22. The tapped metal terminals 32 are secured to the ends of the winding to facilitate connection to a source of current supply.

Where the body of my stator is composed of a molded insulating compound of a kind which must be pressure molded about the winding, the winding is preferably made as rigid as possible before the body of insulation is molded about it, and this is of course accomplished by hardening the fluid insulation within the winding. But before the fluid insulation in the winding is hardened the tool 34, Fig. 2, is preferably inserted into the unfilled portion of the core slots. The tool 34 comprises a base plate 36 having a series of rectangular pins 38 extending therefrom. Pins 38 are slightly tapered at the free ends as at 40 to facilitate insertion into the core slots. When inserted the pins 38 hold the coil sides 28 away from the entrances of the core slots as shown in the fragmentary section Fig. 3. It is in this condition that the insulation in the winding is hardened. After it has been so hardened the tool is withdrawn leaving a series of T-shaped slots 42 surrounding the rotor opening 22 (see Fig. 4). The purpose of these T-shaped slots 42 will hereinafter appear.

Fig. 5 shows the wound core in a mold 44 prepared to have the body of the stator formed about the core and winding. Mold 44 comprises a base 46, a mold ring 48, a stock ring 50 and a plunger 52. Base 46 has an upwardly extending center plug 54. Plug 54 is fitted to the rotor opening 22 and has a series of longitudinal keys 56 of T-shaped cross section corresponding in number and spacing to the T-slots 42. (See Figs. 4 and 6.) Plug 54 is larger immediately below the core to provide the shoulder 58 upon which the inner ends of the core teeth rest. The mold ring 48 has an inner diameter larger than the outside diameter of core 12 leaving space 60 around the outside of the core. The stock ring 50 contains the screws 62 which support the terminals 32. The base 46 supports the screws 64 which keep the mounting bolt holes 26 open while molding is being effected. Screws 66 and 68 hold parts 46, 48 and 50 together. The plunger 52 is slidably fitted to the stock ring 50. A slug 70 of insulation of a kind selected for its mobility, its penetrativeness and its low cost and for its general adaptability for the stator body is shown under the plunger ready to be fluxed and forced into the space 72 downwardly into and through the space 60 and into the space 74. When the plunger 52 has been forced home the insulation slug 70 will have been formed into a stator body 76, Fig. 7, and in this form the stator body is hardened.

When stator body 76 is sufficiently hard the screws 68 are removed, and, by catching by the shoulder 78 and pushing through the holes 80 the base 46 with its plug 54 is withdrawn leaving a plurality of T-slots 42 surrounding the rotor opening. The mold is now inverted, as shown in Fig. 8, and another stock ring 82 is put in the place where base 46 was removed. Stock ring 82 is fastened by again inserting the screws 68. The plunger 84 is slidably fitted to the stock ring 82. The slug 86 of insulation, which is shown under the end of plunger 84, in some instances may be the same kind as was employed for the main body of the stator, since it is only in this manner that the entire core may be covered, but generally the slug will be composed of a different kind of material determined by its adaptability to the particular service to which the stator is to be put. The plunger 84 is sufficiently smaller than the rotor opening 22 to leave the spaces 88 between the plunger and the inner ends of the core teeth. Larger spaces 90 and 92 are left at the end of the core. By applying pressure to the plunger 84 the insulation 86 is forced outwardly and upwardly into and through the T-slots 42 and the spaces 88 into and through the space 90 into the space 92. When the plunger 84 has been pressed home the insulation 86 will have been distributed to form a lining 94, Fig. 9, comprising a layer 96 in the bottom of the opening covering the ends of the teeth as thinly as practicable as at 98, filling the T-slots as at 100 and extending outwardly over the end as at 102. In this condition the lining 94 is hardened.

When the lining 94 is hard the plunger 84 is first withdrawn then the screws 68 and the stock ring 82 removed. The finished stator may then be ejected by pressing upwardly on plunger 52. A completed stator 104 is shown in Figs. 10 and 11 where it will appear that the core and winding are both completely covered, both inside and outside, and sealed in the stator body, which may be entirely of one kind of insulation, but which may preferably be of different kinds, as where the main body 76 of the stator is of one kind of material while the lining 94 is of another, each best suited to its particular function. The lining 94 (see Fig. 11) may be seen to extend thinly over the ends of the core teeth yet securely anchored by the T-shaped portions 106 of the lining which have filled the T-slots 42, Fig. 4. Because of the manner in which the lining material extends into these T-slots the portion of the lining covering the ends of the core teeth may be made very thin, so that the magnetic material of the stator and that of a corresponding rotor will not be too widely separated.

Having described an embodiment of my invention whereby the objects of my invention are attained,

I claim,

A dynamo electric machine stator structure comprising a self-contained hollow cylindrical body composed wholly of hardened insulation, a hollow magnetizable core, a winding, and terminals for said winding all imbedded and sealed in the walls of said cylindrical body, no part of said core, winding or terminals extending through to any of the surfaces of said cylindrical body except the one side of each of the said terminals.

VINCENT G. APPLE.